July 26, 1960  E. GOTHE  2,946,243
TOOL FEED FOR MULTI-SPINDLE AUTOMATICS
Filed Aug. 20, 1956  3 Sheets-Sheet 1

Inventor
E. Gothe

INVENTOR
*ERNST GOTHE*

ATTORNEYS

United States Patent Office 2,946,243
Patented July 26, 1960

2,946,243
TOOL FEED FOR MULTI-SPINDLE AUTOMATICS

Ernst Gothe, Weingartengasse 77, Koln-Poll, Germany

Filed Aug. 20, 1956, Ser. No. 604,946

Claims priority, application Germany Sept. 1, 1955

5 Claims. (Cl. 77—22)

The movement of the end-working tools on a multi-spindle automatic lathe, screw machine and the like was usually effected by a drum cam arranged beneath a so-called tool block which was arranged coaxially with a rotatable spindle carrier and on the periphery of which a plurality of tool holders could be fed endwise towards the workpieces, which drum cam fed the various tool-holders forward through suitable intermediate members. With this construction the feed of all the tool-holders took place simultaneously and by the same amount. Apart from the disadvantage of this arrangement that the machining operations could only take place simultaneously and with the same tool feed it also had the further constructional disadvantage that the space below the tool block was taken up by the drum cam which was of relatively large dimensions and made operation and supervision of the machine difficult.

This construction has therefore been departed from and multi-spindle automatic machine tools have been developed in which the end working tools on the tool block are moved by means of cam discs, the discs on which the cam pieces are mounted being vertically arranged, that is to say, mounted on shafts which are horizontal or in other words parallel to the axis of rotation of the spindle carrier. This arrangement has the disadvantage that the direction of movement in the vertical plane of a transmission member which is called for by the vertical arrangement of the cam disc must be transformed into a horizontal direction of movement of the tool, the transmission member being for the sake of simplicity a lever or coupling rod the ends of which move in three dimensions, that is, their movements are not confined to one plane, and in consequence have to be connected through two ball joints at one end with a lever which coacts with the cam and is provided with a slideway and slide block and at the other end with an angle lever which is provided with a toothed sector. This arrangement which necessitates ball joints is liable to derangements in the transmission of the forces, and is expensive.

It is true that such a construction in contradistinction to that first described permits independent adjustment both of the stroke and of the timing of the movement of each tool on account of the provision of a separate cam disc for each tool, but it has the disadvantage that the transmission rod above described provided with the ball joints extends substantially horizontally and at right angles to the feed direction of the tool so that the adjustment of the slide block on the cam actuated lever has to be effected from the side surfaces of the drive casing. The setter must therefore walk round the machine and adjust the right-hand and left-hand cam discs in groups. In addition, this construction has the disadvantage that the cam discs are vertical and accordingly when the cam pieces are released the securing bolts or the cam pieces themselves can fall into the drive casing.

These disadvantages are overcome by the present invention according to which the cam discs are arranged horizontally, that is to say, with their axes transverse to the axis about which the spindle carrier rotates.

By this arrangement according to the invention, the intermediate lever between the cam follower, which co-operates with the disc cam and the toothed segment for feeding forward the respective end-working tool, can lie and rock directly in a plane parallel to the plane of the disc so that the pivotal joints can consist of simple pins or the like. The automatic lathe or like machine is in this way rendered less liable to derangement. Further, the cam pieces can be arranged on the upper surface of the disc so that when their securing means are loosened both the securing elements such as screws and the cam pieces themselves remain lying on the disc so that both securing of parts and exchange of the same are substantially simplified. When a plurality of cam discs are provided as is generally usual, the discs can be arranged one above another either in a single series or in known manner in two groups which lie on the right and left-hand sides of the mid vertical plane of the machine. Through this arrangement the servicing and exchange of the cam pieces and the adjustment of sliding members is considerably facilitated, since when the screws securing sliding pieces are loosened the sliding pieces do not fall downwards due to their own weight, but on the contrary retain their position due to the horizontal arrangement of the discs. The same holds true as applied to the adjustment of the cam pieces if they are not to be exchanged because in the horizontal arrangement according to the invention of the cam discs, after loosening the cam pieces these can be rotated or moved without any tendency, as in the known constructions with vertical discs, to take a position with the centre of gravity lowermost owing to their own weight. If the cam pieces are suitably shaped, such that they embrace the hub of the disc over more than half of its circumference, it is further possible without difficulty to provide a single shaft for a plurality of discs arranged one above another without losing the advantages above described.

As the cam discs arranged according to the invention only occupy limited space and this is in any case available in the machine casing, it is further possible without difficulty to actuate the cross tool slides arranged on cross slideways in a similar manner for which further cam discs have to be provided. This applies especially to the upper cross slides because here the connecting rods between the cam discs and the cross slides do not hinder the view. However, a corresponding arrangement though with less advantage can be provided for the lower cross slides.

The outstanding feature of the invention which is to be seen in the use of an intermediate member which moves only in a single plane as well as the coupling of this intermediate member to the adjacent elements by simple pins, the member being stressed solely in compression and tension, makes it possible for the first time to give these simple pivot pins a further function. In the arrangements hitherto known so far as the pivoted joints were moved in three dimensions and provided with ball joints, it was only possible to provide safety members to prevent overloading of the tools in such a way that all the end-working tools were put out of action simultaneously when only one of them was overloaded. This is disadvantageous insofar that a single safety device in the form of a shear pin, a spring or the like had to be adjusted according to the total load on all the tools. If one of the tools was for example a very small drill of say 2 mm. diameter, any increased resistance presented to this drill would be hardly noticeable at the safety device so that it was possible for such a drill to break without the safety device coming into action. Individual adjustment was not possible.

According to the present invention it is now simple to construct one of the pivot pins as a shear pin corresponding to the strength of the particular tool so that simultaneously with the tool itself the shear pin can also be changed. This exchange can further be facilitated if this shear pivot pin could at the same time be inserted into one of several holes in one of the coupled elements so that the stroke can be adjusted in steps. Thus in adjusting the machine the shear pin can be withdrawn, replaced by another corresponding to the new tool and inserted in a hole corresponding to the stroke range desired, this stroke then being finely adjusted by the aid of a slideway and slide block.

The invention will be further described with reference to an example illustrated in the accompanying drawings.

Figure 1:
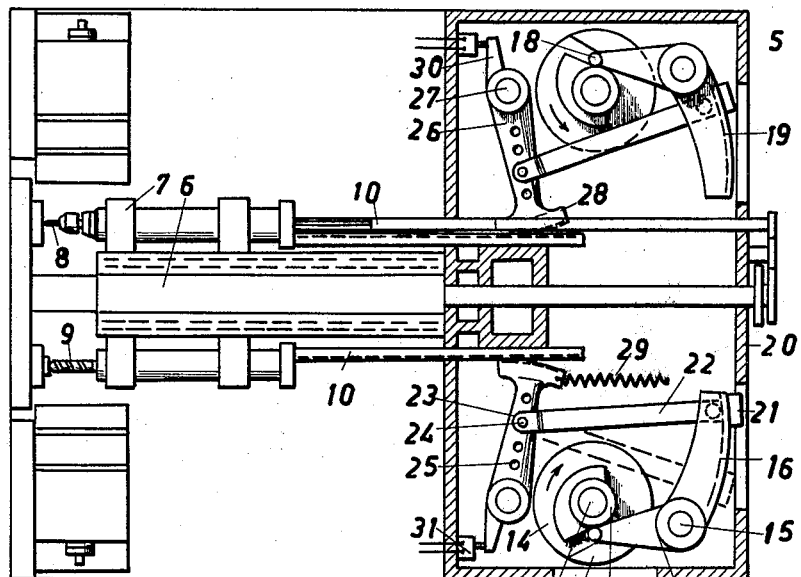
Fig. 1 is a plan view of a multi-spindle automatic lathe according to the present invention with some parts in section.

In the multi-spindle automatic lathe illustrated, a tool block 6 is longitudinally adjustable in a casing 5. Upon the block slide end-working tool-holders 7 in which the tools for example drills 8, 9, can be gripped. The rear parts of the tool-holders are provided with toothed racks 10 and according to the invention they are moved as follows. In the casing 5, two driving shafts 11 for rotating plates or cam discs 12 are vertically arranged so that according to the invention the plates or cam discs 12 lie horizontally. These discs are secured to the shafts by hubs 13 which are embraced over more than half of their circumferences by cam pieces 14. The cams or cam pieces 14 and the hubs are secured together in such a way that adjustment of the cam pieces can be effected by the aid of index marks upon them which cooperate with scales marked on the peripheries of the plates or discs. The cams or cam pieces are secured to the discs by the aid of screws as seen in Figs. 4 and 5 of the drawing and after loosening of all these connecting means can be lifted vertically from the hubs and be exchanged.

Figure 4:
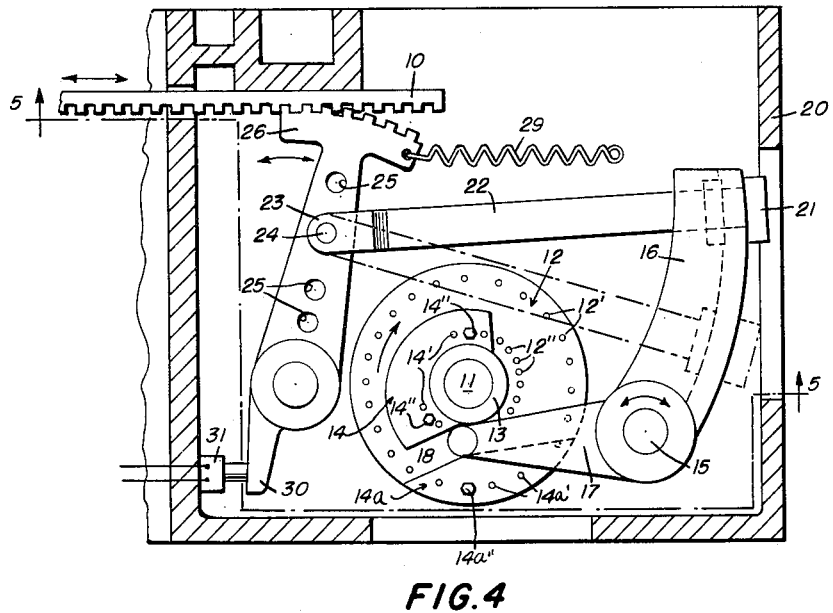
Fig. 4 is an enlarged view of a portion of Fig. 1 showing the adjustment of the cam plates.
Figure 5:
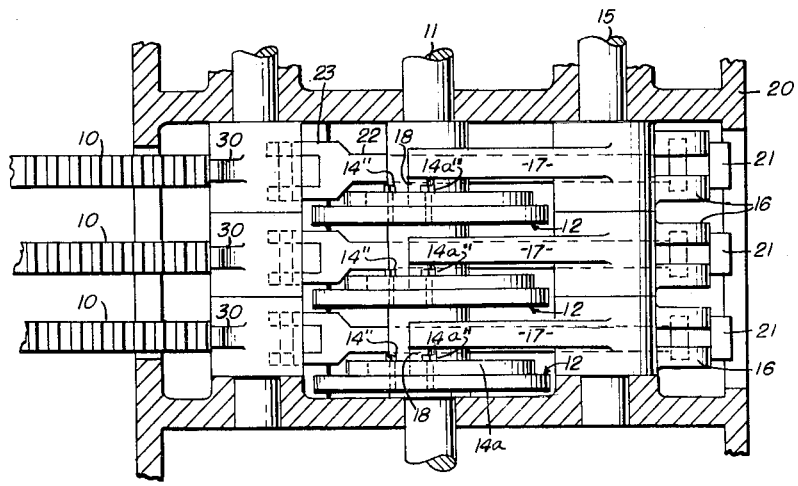
Fig. 5 is an enlarged view of a portion of Fig. 2 showing the adjustment of the cam plates.

In Figs. 4 and 5 it will be seen that cam discs 12 are provided with a circle of holes 12' near the periphery of the disc 12 and a second circle of holes 12" near the hub. Cam piece 14 is provided with holes 14' to receive screws or bolts 14" by which the cam piece 14 is secured, using selected holes 12", to cam disc 12. Similarly, reversing cam piece 14a is provided with holes 14a' into which bolts 14a" extend to locate by selection of appropriate holes 12' and secure cam piece 14 on to the cam disc 12. It will be clear, then, that the timing of the advance and withdrawal of the tools can be adjusted by proper location of the cam pieces on the cam discs and the advance and withdrawal of the tools are controlled by the selection of the appropriate cam pieces and by the selection of the appropriate hole 25, and by movement of slide block 21 in lever 16, as explained below.

In accordance with a further characteristic feature of the invention angle levers 16 are pivoted at 15, one arm 17 of each lever coacting by means of a roller 18 with the corresponding cam, while the other arm 19 of the lever is constructed as a slideway and extends more or less parallel to the rear end wall 20 of the casing. In this slideway 19 works a slide block 21 which is part of a coupling rod 22. The other end 23 of the rod is pivoted by means of a shear pivot pin 24 with one of four holes 25 which are provided in a toothed segment lever 26 and correspond to different steps of stroke adjustment, fine adjustment of the stroke between the steps being effected by the aid of the slideway and slide block 21. At the outer end of the lever which is pivoted at a fixed point 27 a toothed segment 28 is provided which meshes with one of the above-mentioned toothed racks 10. The lever 26 is under the action of a spring 29 and has a projection 30 at its pivoted end which can co-operate with an electric switch 31. The angle levers 16, the toothed segment levers 26, and coupling rods 22 constitute linkage means for transmitting motion from the cams 14 to the tool holder means 7 including their respective tools 9.

Figure 2:
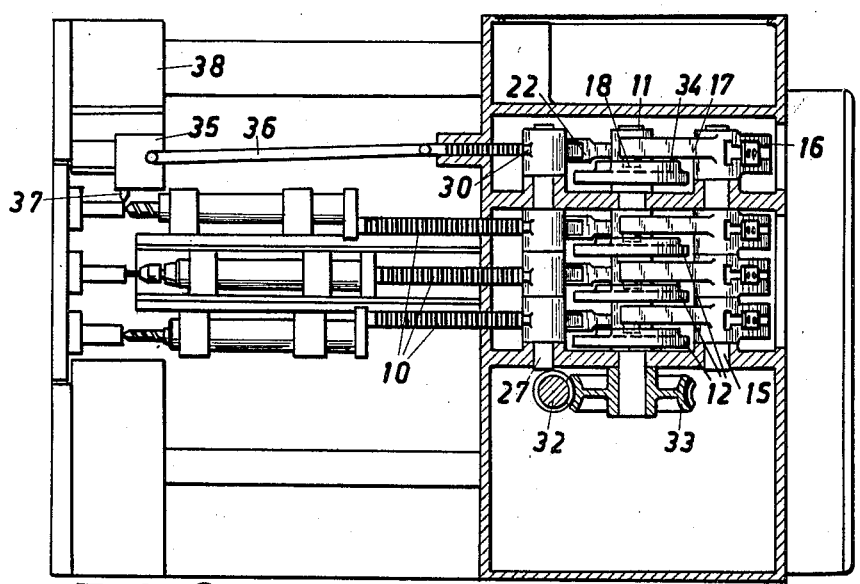
Fig. 2 is a side view of the same automatic lathe also partly in section.
Figure 3:
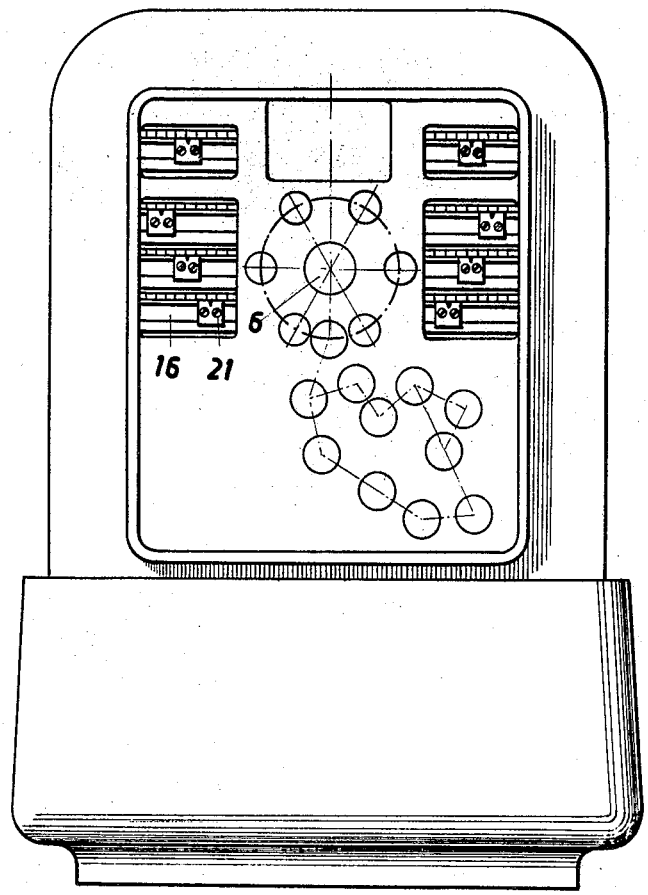
Fig. 3 is a rear view with the end wall removed.

As Fig. 2 shows the drive of the two shafts 11 is effected through a worm 32 and worm gear or wheel 33, the shafts carrying the individual cam discs 12 corresponding to the individual tool-holders arranged one above another. The example illustrated is a six spindle machine so that each of the two shafts 11, one on each side, is provided with three cam discs 12 for the end-working tools. Above these discs is a fourth cam disc 34 which in a similar manner to that above-described through a push rod 36 moves a cross slide 35 which carries a turning tool 37 and can be moved longitudinally in a cross carriage 38.

The advantages of the arrangement according to the invention are immediately visible in the illustrated example. Thus from the outside the timing of the stroke of each tool-holder can be effected through a window 39 by rotating the cam piece 14 on the hub 13 by a reference to the index mark and scale. The cam piece is easily accessible from outside and cannot fall into the casing since it is in accordance with a preferred but not absolutely essential embodiment of the invention arranged on the upper side of the disc. Clearly, the cam pieces could be arranged on the underside of the discs if this should be necessary. The exchange of the cam pieces is also simple to effect. The adjustment of the stroke is particularly advantageously arranged as all the slideways 19 and slide blocks 21 are accessible from the rear so that by reference to the scales which are marked on the slideways the adjustment of all strokes including those for the cross slides can be directly effected and at the same time the gearing can be adjusted and supervised because all change wheels are also located on the back of the casing.

As soon as the tool is damaged or an excessive resistance is encountered for some other reason the corresponding shear pin 24 breaks so that the corresponding tool is retracted by the toothed segment 26 under the action of the tension spring 29. Thereupon the projection 30 on the lever 26 engages the switch 31 and switches the machine off so that the other tools are not endangered.

The invention can be modified in various ways. Thus it is possible to provide only a single shaft and mount all the cam discs upon it. Further, the invention can be utilised only in part as already mentioned by mounting the cam pieces on the under sides of the cam discs; additional connecting elements can be provided, the gear arrangement can be different, the slide blocks can be adjustable from the side and so forth.

Having thus described my invention, what is claimed and desired to be secured by Letters Patent is:

1. A tool feed mechanism independently controlling movement of a plurality of tools adapted to each perform a predetermined machining operation on individual workpieces, each said workpiece being supported by an associated spindle of a multiple spindle automatic lathe and the like, comprising a plurality of tool holder means adapted to each support a tool for performing said predetermined machining operation on said individual workpieces, a housing wherein said tool holder means are arranged, at least one vertical rotatable shaft supported by said housing, said vertical rotatable shaft being rotatable about its longitudinal axis, a plurality of individual plates connected to said vertical rotatable shaft, said individual plates each being substantially orthogonally disposed with respect to the longitudinal axis of said rotatable shaft, cam means carried by each of said plates, said plates being provided with an upper and lower face, respectively, said cam means carried by said plates being adjustable and located on said upper face, thereby preventing said cams, during adjustment thereof, from dropping into said housing, and a linkage connecting each said tool holder with a corresponding one of said cam means, whereby rotation of said cam means actuates each said linkage, thereby effectuating movement of each said tool holder including said tool independently of each other relative to said individual workpieces.

2. A tool feed mechanism according to claim 1, wherein one of said plates and its corresponding cam means and linkage is utilized to impart movement to a cross slide of the lathe.

3. A tool feed mechanism independently controlling movement of a plurality of tool means adapted to perform a predetermined machining operation on respective workpieces each supported by an associated spindle of a multiple spindle automatic lathe and the like; comprising a housing, tool holder means carried by said housing for axial movement therein and adapted to support said tool means for performing said predetermined machining operation upon said individual workpieces, vertical shaft means supported by said housing, drive means cooperable with said vertical shaft means for imparting to the latter rotational movement about its longitudinal axis, individual cam discs spaced from each other along said longitudinal axis of said vertical shaft means and secured to the latter for rotation therewith, said individual cam discs lying in substantially horizontal planes, adjustable cam pieces carried by said cam discs and lying in planes which are substantially parallel to said horizontal planes of said individual cam discs, angle lever means disposed adjacent said cam discs and having one end in contact with said cam pieces, said angle lever means being pivotable about a vertical axis, and means operatively connecting the other end of said angle lever means with said tool holder means, so that movement of said cam pieces is translated to said tool holder means whereby the latter including said tool means are moved independently of each other relative to said workpieces.

4. A tool feed mechanism according to claim 3, wherein each of said tool holder means is provided with a toothed rack, said other end of said angle lever means being provided with a slideway, said means operatively connecting the end of said angle lever means with said tool holder means comprising connecting rods each having a slide block at one end for sliding movement within said slideway, pivotable lever means secured to the other end of said connecting rods and provided with teeth for engagement with a corresponding rack of said tool holder means.

5. A tool feed mechanism according to claim 4, said pivotable lever means having a series of openings for regulating the feed movement of said tool means, a shear pin disposed in one of said openings and connected to its associated connecting rod, and resilient means in registry with said pivotable lever means for retracting said tool means from its respective workpiece and to deactivate the workpiece spindle upon rupture of said shear pin due to overloading of said tool means.

References Cited in the file of this patent

UNITED STATES PATENTS

| | | |
|---|---|---|
| 736,395 | Hinckley | Aug. 18, 1903 |
| 786,353 | Gabriel | Apr. 4, 1905 |
| 812,208 | Kahlenberg | Feb. 13, 1906 |
| 931,119 | Hocking | Aug. 17, 1909 |
| 1,838,625 | Horste | Dec. 29, 1931 |
| 2,007,564 | Dixon | July 9, 1935 |
| 2,108,779 | Schafer et al. | Feb. 15, 1938 |
| 2,614,446 | Miller | Oct. 21, 1952 |
| 2,677,281 | Gibson | May 4, 1954 |

FOREIGN PATENTS

| | | |
|---|---|---|
| 275,883 | Switzerland | Sept. 17, 1951 |